United States Patent [19]

Wu

[11] Patent Number: 4,644,526
[45] Date of Patent: Feb. 17, 1987

[54] FULL DUPLEX FREQUENCY DIVISION MULTIPLEX COMMUNICATION SYSTEM

[76] Inventor: Chialin Wu, 970 Medford Rd., Pasadena, Calif. 91107

[21] Appl. No.: 671,124

[22] Filed: Nov. 13, 1984

[51] Int. Cl.⁴ .......................... H04B 1/50; H04B 3/21
[52] U.S. Cl. ..................................... 370/30; 370/124; 455/76; 455/86
[58] Field of Search .................. 370/30, 71, 124, 69.1; 455/34, 53, 54, 61, 102, 76, 86

[56] References Cited

U.S. PATENT DOCUMENTS 2,113,765  4/1938  Murphy ................................. 370/30
4,564,940  1/1986  Yahata ................................. 370/124

Primary Examiner—Douglas W. Olms
Assistant Examiner—M. Huseman
Attorney, Agent, or Firm—Keith D. Beecher

[57] ABSTRACT

A full duplex frequency division multiplex communication system which comprises a number of transceivers constituting user stations which communicate with one another over a common channel, such as a wireless link or a two-direction coaxial cable, with each transceiver operating on a single fixed intermediate frequency for transmission and reception. The system includes a network frequency converter for shifting the transmission frequency band used by the transceivers into a different receiving frequency band which does not overlap the transmission frequency band. Single sideband modulation of the intermediate frequency carrier is used, and full duplex communication is achieved by using one of the sidebands of the intermediate frequency carrier for transmission, and the other sideband for reception. Each transceiver includes a programmable frequency synthesizer for channel selection, and upper and lower sideband filters, with one of the filters being used for transmission and the other for reception.

8 Claims, 1 Drawing Figure

FULL DUPLEX FREQUENCY DIVISION MULTIPLEX COMMUNICATION SYSTEM

BACKGROUND OF THE INVENTION

The frequency division multiplex communication system of the present invention is of the same general type as the systems described in U.S. Pat. Nos. 3,809,815; 3,809,816 and 4,107,471.

For example, a full duplex frequency division multiplex communication system is disclosed in U.S. Pat. No. 3,809,815, in which a digital phase-locked loop synthesizer is used for generating a series of frequencies for a single sideband communication system. Single sideband transmission and reception, and frequency division multiplexing are used in the system described in the patent to provide channelization. A bandpass filter provides the necessary inversion of transmitting and receiving frequencies required to establish full duplex communication.

U.S. Pat. No. 3,809,816 discloses an appropriate system for generating a frequency pattern to provide transmitting and receiving frequencies inversion in a frequency division multiplex communication system. The relationship between the transmitter intermediate frequency and the frequency transmission band required for proper operation of the system is also described in the patent.

U.S. Pat. No. 4,107,471 discloses a frequency division multiplex communication system in which one of the sidebands of a modulated intermediate frequency carrier is used for communication and the other sideband is used for other purposes. In the system described in this patent, inversion of the transmitting and receiving frequencies is achieved by using a bandpass filter having a passband of twice the frequency difference between the transmitter and receiver intermediate frequency, rather than the passband used in the systems of the previous patents of twice the transmitter intermediate frequency. In the system of U.S. Pat. No. 4,107,471, both sidebands are independently available with either the upper or lower sideband being assigned for carrying the transmitted signal and the other sideband being used for other purposes.

Briefly stated, U.S. Pat. No. 4,107,471 is directed to a frequency division multiplex full duplex communication system using a first intermediate frequency carrier for transmission and a different intermediate frequency carrier for reception; in conjunction with a sideband filter technique to achieve a desired frequency in a pair of communication transceivers.

The system of the present invention, on the other hand, causes sideband filters to be switched about a fixed intermediate frequency for transmission and reception, in conjunction with a network frequency translator which separates the frequency bands for transceiver transmission and reception. The use of the two sidebands of a single fixed intermediate frequency carrier in the system of the present invention for transmission and reception provides for effective use of the frequency spectrum. The switchable feature of the sideband filters facilitates the communication between any two transceivers in the system. The use of a network frequency converter or translator separates the transceiver transmission and reception frequencies into two distinct non-overlapping frequency bands. As a result, echo interference is significantly minimized even though the transmission and reception carriers share a common intermediate frequency.

The system described in U.S. Pat. No. 4,107,471 is different from the system of the present invention in that two intermediate frequencies are used, as noted above, and a total of four sidebands, two for each intermediate carrier frequency, are available for two-way information communication and out-of-band signalling. In the system of the present invention, the use of one common intermediate frequency with the associated two sidebands being available respectively for transmission and reception is most efficient in frequency spectrum utilization, as compared with the four sidebands required in the prior system of U.S. Pat. No. 4,107,471.

The system of the present invention in the embodiment to be described is made up of a number of user stations, with each user station including a transceiver. A common communication channel, such as a two-directional coaxial cable, or a wireless link, is provided and each transceiver is coupled to the common channel. Each transceiver includes a first transmission modulator which provides a first step single sideband amplitude modulation of an intermediate frequency carrier by the information signals, and a second transmission modulator which provides a second step modulation function which shifts the frequency of the single sideband amplitude modulated intermediate frequency carrier by a predetermined amount according to the specific frequency channel assignment for the particular user station. Each transceiver also includes a reception demodulator which, as a first step, converts a received single sideband amplitude modulated signal into the selected intermediate frequency range, and then as a second step demodulates the converted signal.

A common network frequency converter is also coupled to the communication channel, and it serves to shift the transmission frequency band of the individual transceivers into a different non-overlapping reception frequency band, and to retransmit the shifted frequency band to the transceivers.

The amount of frequency conversion provided by the reception demodulator in an individual transceiver is a combination of the network conversion frequency from the frequency converter and the frequency of the channel assigned to the particular transceiver.

The intermediate frequency used for single sideband demodulation in any user station transceiver is the same as the intermediate frequency used in that user station transceiver for transmission modulation.

Upper and lower sideband filters are provided in each transceiver, as mentioned above, one of the filters being used for transmission and the other for reception. When two transceivers establish a communication link with one another, the sideband filter assignment for one of the transceivers for transmission and reception is made to be opposite to the sideband filter assignment for the other transceiver for transmission and reception. In this way, the information signal transmitted by upper sideband modulation in the first transceiver will be demodulated by an upper sideband demodulation in the second transceiver, and the second transceiver will transmit its information signal with a lower sideband modulation which is compatible with the receiving sideband filter of the first transceiver. Sideband filter switching means are provided in each transceiver in order that any two transceivers in the network may form a pair of communicating transceivers, with the format described above.

DETAILED DESCRIPTION OF THE ILLUSTRATED EMBODIMENT

Figure 1:
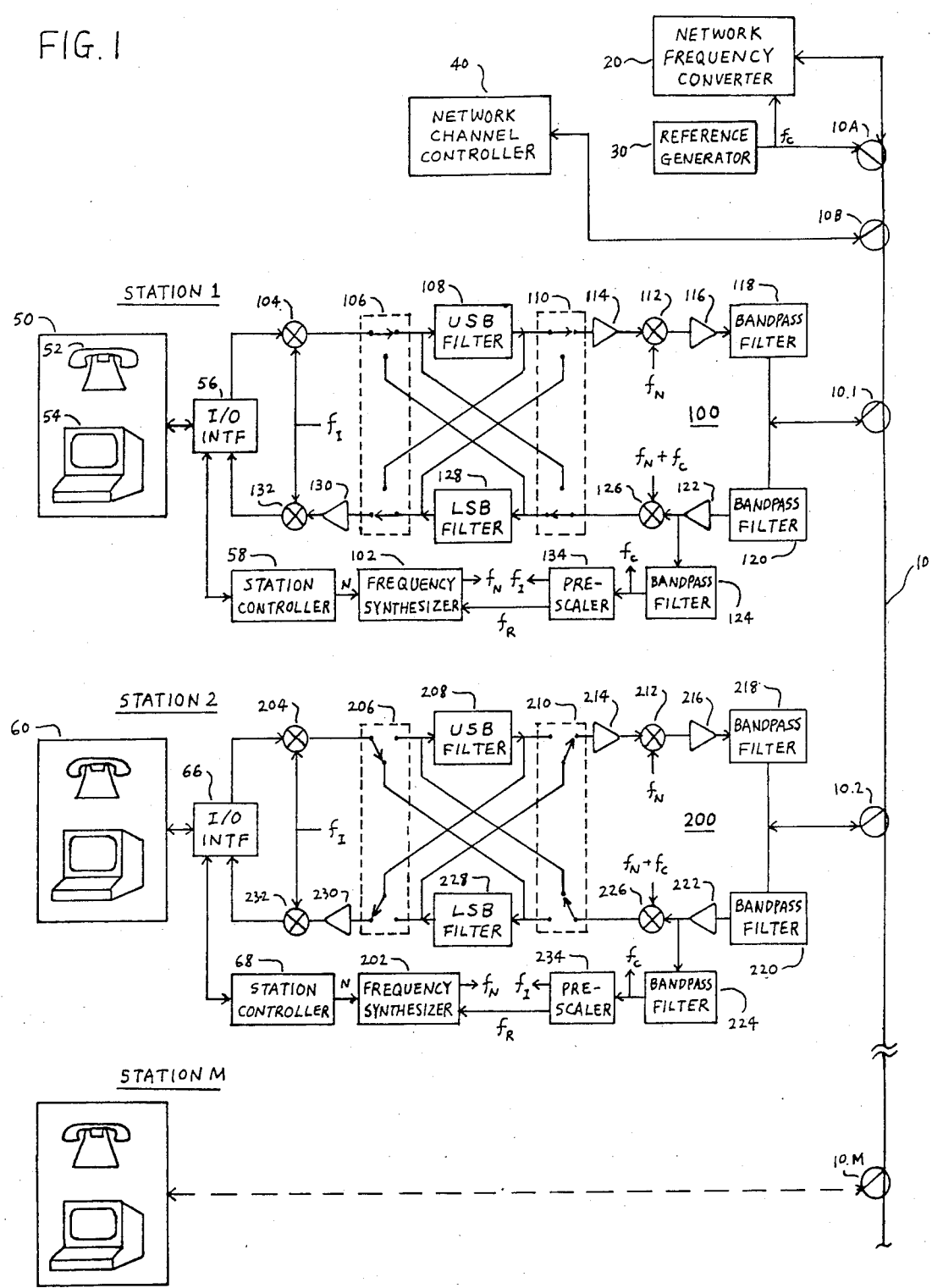
FIG. 1 is a block diagram of a multiple user full duplex frequency division multiplex system incorporating the concepts of the present invention.

As shown in FIG. 1, a number of user stations 1, 2 . . . M are coupled to a common communication channel, such as a two-way coaxial cable 10, through appropriate cable couplers designated 10.1, 10.2 . . . 10.M. A network frequency converter 20 is connected to the system at one end of the cable. The network frequency converter 20 receives all the signals transmitted from the various user stations within the assigned frequency band, and converts the signals into a different and non-overlapping frequency band for reception by the transceivers over cable 10. A reference signal generator 30 is also coupled to cable 10 at 10A, and it transmits a reference pilot tone $f_c$ signal over the cable for network frequency synchronization. A network channel controller is also coupled to cable 10 at 10B.

The coaxial cable 10, the directional couplers 10A, 10B, 10.1 . . . 10.M, and the network frequency converter 20 may be of the type presently in widespread use in cable television distribution systems.

Each user station 1, 2 . . . M comprises a transceiver which processes the transmission and reception information signals with appropriate intermediate frequency modulation and demodulation techniques. Each user station also includes a user information input and output device like 50 for station 1, which may be in the form of a telephone set 52 for voice audio signal input and output, or a computer data terminal or communication terminal 54 for data communication.

The transceivers for the first two representative user stations are designated 100 and 200. The user information signal input and output devices for these two representative stations are designated 50 and 60, respectively. For the same transceiver, it is assumed that either the voice or data terminal requires the same signal transmission bandwidth and spectral response so that all the transceivers in the system may be of identical design, regardless of their application to voice or data communication. For the single-sideband amplitude modulation method described herein, it is also assumed that information signals originated from the input and output devices exhibit bandpass characteristics. That is, the information signals do not have appreciable spectral components near zero frequency. These type of signals include normal voice signals and digital data signals processed by a conventional modem device.

It is further assumed that transceivers 100 and 200, in the illustrated instance, embodiment, communicating with one another, and that transceiver 100 represents the calling party and transceiver 200 represents the called party. Upper and lower sideband filters 108 and 128 are switched by switches 106 and 110 so that the calling transceiver 100 uses the upper sideband filter 108 for transmission modulation and the lower sideband filter 128 for reception demodulation, whereas the called transceiver uses the lower sideband filter 228 for transmission modulation and the upper sideband filter 208 for reception demodulation.

In the user station 1, the user information signal input and output device 50 may, for example, be in the form of telephone set 52, or data input/output terminal or communication device 54, as mentioned above. An input and output (I/O) interface network 56 is interposed between the user input/output device 50 and the transceiver 100. A microprocessor based station controller 58 is also connected to the input/output interface network 56, The input/output interface network handles control signalling between the user input/output device and the controller, and between the controller and the transceiver, in order to establish or to terminate a communication session.

During such a communication session, for either voice or data signals, the interface network is directed by the controller to pass information signals between the user input/output device 50 and the transceiver. The operation of the controller 58 is based on a software program within the controller. Other than the signalling function, one important output of the controller is a digital word N which establishes the communication channel frequency $f_N$ when it is fed into a programmable frequency synthesizer 102. The controller 58 also directs the switching function of the sideband selection switches 106 and 110. The electronically controlled switches may be in the form of solid state or relay type of switches.

The input audio or data signals from the input/output interface network 56 at user station 1 are applied to a balanced modulator 104, and are amplitude modulated on an intermediate frequency carrier $f_I$. The modulator output passes through switch 106 to the selected sideband filter 108 or 128.

As shown, in the particular example, the upper sideband filter 108 is used in the transmission modulation in transceiver 100 of station 1. Switch 110 directs the upper sideband modulated signal to a second transmitter modulator 112 where the single sideband amplitude modulated signal is frequency shifted by channel frequency $f_N$ for transmission.

Amplifiers 114 and 116 are responsive in the intermediate and transmission frequency ranges respectively to accommodate various insertion losses and to amplify the output transmission signal to a desired level. Modulator 112 includes a bandpass function which retains the output signal within the transmission band of the system. A transmission bandpass filter 118 is used in conjunction with a receiver bandpass filter 120, and the two bandpass filters have different and non-overlapping passband responses, so as to form a diplexer for the input and output signals including impedance matching and attenuation pads (not shown).

The transmitted signal from the transceiver 100 is applied to coaxial cable 10 through coupler 10.1; and the transmitted signal is frequency shifted by an amount $f_c$ in network frequency converter 20, which is also commonly referred to as a "head end converter". The frequency shifted signals from converter 20 are amplified and transmitted to all the transceivers over cable 10. Other peripheral equipment such as bidirectional amplifiers on trunk and distribution cables may be incorporated into the system, all of which are well known to the cable television art. As mentioned above, reference generator 30 generates a signal of frequency $f_c$ for converter 20, and it also transmits the $f_c$ signal over the cable 10 as a pilot tone for synchronizing purposes.

The receiver bandpass filter 120 of transceiver 100 accepts not only the signals in the reception band transmitted from the frequency converter 20, but also receives the pilot signal $f_c$ from the reference generator 30. After proper amplification by amplifier 122, the pilot signal $f_c$ is filtered out by a narrow bandpass filter 124. The pilot signal $f_c$ is combined with the channel frequency $f_N$ by a mixer (not shown) to produce a demodulation signal of frequency $f_N+f_c$, which is used in a balanced mixer 126 to shift the frequency of the received signal. The signal from mixer 126 passes through the lower section of switch 110, lower sideband filter 128, the lower section of switch 106, and through an amplifier 130, to a single sideband product demodulator 132 which recovers the modulated information signals. The demodulator 132 produces information signals are applied to the user device 50 through the input/output interface network 56, and to the station controller 58 through the input/output interface network. Variations exist in the form of positioning of the amplifiers in both transmission and receiving paths, depending on the performance requirements and selection of mixer and filter components. Another variation is to use additional stages of intermedite frequencies before or after the sideband filtering to accommodate special performance requirements for spurious rejection in a broadband application.

The pilot reference signal $f_c$ selected by narrow band filter 124 is also used to provide the intermediate frequency signal $f_I$ and to provide a reference signal $f_r$ for the programmable frequency synthesizer 102, this being achieved by means of a frequency pre-scaler 134. The programmable frequency synthesizer 102 comprises a phase detector, loop filter, voltage controller oscillator, and a feedback frequency divider, wherein the output word N from the station controller 58 is used to establish the selected channel frequency $f_N$. This frequency synthesizer may be any well known available circuit which is widely used in the art of radio communication.

The called transceiver 200 in user station 2 functions in the same manner as the transceiver 100 described above, except that during the session of communication with transceiver 100, the circuits are switched by switches 206 and 210 in a criss-cross manner, as shown. Accordingly, the transceiver 200 uses the lower sideband filter 228 for transmission modulation and the upper sideband filter 208 for receiving demodulation. With the same fixed intermediate frequency $f_I$, which is a constant for all transceivers controlled by pilot tone $f_c$, and the same channel direction frequency $f_N$ which matches with that of the first transceiver 100. The sideband filters provide that information signals transmitted from transceivers 100 are demodulated by transceiver 200 and are introduced through input/output interface 66 to user terminal 60 at transceiver 200. Similarly, the information signals originating from terminal 60 at transceiver 200 will be received by the terminal 50 at transceiver 100. The sideband switching complex is a required feature in each transceiver. For example, transceiver 200 may be required to function as a calling transceiver on another occasion. Other elements of transceiver 200 corresponding to like elements of transceiver 100 have been designated by similar numbers plus 100.

In summary, an important feature of the system of the present invention is the use of two sidebands of a fixed intermediate frequency in conjunction with appropriate switching complexes to achieve frequency division multiplexing full duplex communication with the maximum efficient utilization of frequency bandwidth, and a fixed intermediate and a programmable channel frequency in each transceiver.

The use of the network headend frequency converter 20 separates the transmission and reception frequency bands, and this materially reduces the local echo interference within the transceiver, so as to make one fixed intermediate frequency for both transmission and reception possible. Frequency synchronization for single sideband operation is another important feature of the invention.

The single sideband channel system described above requires the use of in-band signalling to initiate and terminate a communication session. When the number of stations is smaller than the total number of available channels, each station may be permanently assigned to a particular frequency channel. Each station continuously monitors its designated channel for signalling, and uses that particular channel for communication when it is called by another station. To avoid a third station from interfering with a pair of stations which are engaged in a particular session of communication, without the need for complex in-band signaling and automatic detection procedures, a central channel controller 40 is used for communication control. All available communication channels may be categorized into control channels and information channels. The information channels are used mainly for transmitting information signals between the user stations. The control channels may be grouped into start, stop and paging channels. The channel controller 40 is capable of simultaneously servicing a number of channels which include all the control channels and a number of information channels. The controller may be equipped with a number of aforedescribed network transceivers and they are coupled to the network through a plurality or a common coupler represented by 10B. The start and stop channels are used by user stations to access the network controller 40 so as to initiate and terminate communication sesssions. The paging channels may be used by the controller 40 to page called transceivers. When a transceiver is in a standby state, its station controller 58 always establishes the transceiver in a called state and to receive the designated paging channel.

Digital signalling is used between transceivers and the network controller 40. A plurality of start and stop channels are used. To access a start or stop channel so as to initiate or terminate a session of communication with another station, the calling station applies the well-known carrier sense multiple access (CSMA) technique. Briefly stated, the calling station first listens to the intended channel to determine the presence of a signal from another station. When no signal is detected, it then transmits a channel blocking tone or code for a fixed amount of time, and it then transmits a set of codes recognized by the network controller 40.

When the calling station receives a network acknowledge signal within a predetermined amount of time, communication with the network controller 40 is established. If no proper acknowledgment signal is received by the calling station within the specified period, the station may randomly pick another start or stop channel for another trail. The network controller 40 manages the assignment at the channel direction frequency $f_N$ of the calling and the called stations. Hand-shaking between a user station and the network controller after an information channel is assigned is carried out in the information channel for frequency verification. All communication protocol control at a user station is handled by its station controller 58 with digital codes with the network controller and the station controller of the other station in the pair. Signalling to the user such as ringing, line-busy signal, etc., is made very much the same as that in a conventional telephone. According to the state of the station, the station controller controls the generation of signallings, the interface circuit connections, the sideband switches, and so on.

The invention provides, therefore, an improved and efficient full duplex frequency division multiplex communication system. It will be appreciated that while a particular embodiment of the invention has been shown and described, modifications may be made. It is intended in the claims to cover all modifications which come within the spirit and scope of the invention.

I claim:

1. A duplex frequency division multiplex communication system comprising: a plurality of user stations intercoupled by a common communication channel, a first frequency converting means coupled to said common channel for shifting the carrier frequencies of the signals introduced to the common channel by all of the user stations by a particular frequency differential for reception by the user stations, each of said stations comprising a transceiver and each transceiver comprising: a source of information signals; modulating means coupled to said source for modulating said information signals on a first carrier of a particular frequency; second frequency converting means; first means for applying the first modulated carrier from said modulating means to said second frequency converting means to shift the first carrier to a selected channel frequency; second means coupled to said second frequency converting means for introducing the output from said second frequency converting means to said common channel; third frequency converting means; third means for introducing signals from said common channel modulated on a second carrier of a particular channel frequency to said third frequency converting means, said second carrier having a frequency displaced from the frequency of said first carrier by said particular frequency differential; demodulating means; fourth means for applying output signals from said third frequency converting means to said demodulating means to recover the signals modulated on the second carrier; and information reproducing means coupled to said demodulator means.

2. The system defined in claim 1, and which includes a reference generator coupled to said third frequency converting means and to said common channel to supply a frequency converting signal to said third frequency converter and a synchronizing signal of the same frequency to said common channel.

3. The system defined in claim 2, in which said transceiver includes filter means coupled to said common channel for recovering said synchronizing signal; and first circuit means coupled to said filter means for producing an output signal having a predetermined frequency relationship with said synchronizing signal and for introducing said output signal to said modulating and demodulating means.

4. The system defined in claim 3, and which includes second circuit means for producing a further signal having a particular channel frequency which is different for each of the user stations and for introducing said further signal to said first frequency converting means.

5. The system defined in claim 4, and which includes third circuit means coupled to said filter means and to said second circuit means for introducing a signal having a frequency corresponding to the sum of the particular channel frequency and the synchronizing frequency to said second converting means.

6. The system defined in claim 1, in which said first and fourth means include respective upper and lower sideband filters.

7. The system defined in claim 6, in which said first and fourth means further include switching means for selectively switching said upper and lower sideband filters in circuit with said modulating means and first frequency converting means and with said second frequency converting means and said demodulating means.

8. The system defined in claim 1, in which said second means includes a bandpass filter for passing the output from said first frequency converting means to said common channel; and said third means includes a bandpass filter for passing signals from said common channel modulated on a carrier of a particular channel frequency to said second frequency converting means.

* * * * *